UNITED STATES PATENT OFFICE.

MIECZYSLAW KOWALSKI, OF LEMBERG, AUSTRIA-HUNGARY.

PROCESS OF PURIFYING RAW JUICES IN THE SUGAR MANUFACTURE.

994,646.  Specification of Letters Patent. Patented June 6, 1911.

No Drawing.  Application filed June 5, 1907. Serial No. 377,458.

*To all whom it may concern:*

Be it known that I, MIECZYSLAW KOWALSKI, subject of the Emperor of Russia, residing at Lemberg, in Galicia, Austria-Hungary, have invented certain new and useful Improvements in Processes of Purifying Raw Juices in the Sugar Manufacture, of which the following is a specification.

This process essentially consists in that the quantities of lime required for the preliminary defecation and for the defecation proper as also the limits of alkalinity favorable in the operation of saturation are varied according to the nature of the treated juice and are determined each individual time.

The novelty of this process therefore consists neither in the known cold preliminary defecation (such as is described in German Patent 94867 to Ragot, German Patent 115818 to Schwager, German Patent 102163 to Stutzer) nor in those processes which have for purpose to reduce the quantity of lime (v. Hefter, Dr. Kuthe, Anders and others); but it consists in the precise determination of the quantities of lime required for the preliminary defecation and for the defecation proper as also of the degree of alkalinity which yields the most favorable results during saturation, which quantities of lime and degrees of alkalinity are depending upon the nature of the juice and should not be exceeded.

The new process consists in the following operations:

A small quantity or sample of the cold diffusion juice is submitted to a test of a cold defecation with lime in the shape of oxid of lime CaO or hydroxid of lime $Ca(OH)_2$, the distinctive feature proving that the quantity of lime added to the given quantity of juice is precisely the quantity that is required for the preliminary defecation consisting in that the treated raw juice can be separated easily from the precipitate originated therein by filtration through filtering paper and that the obtained filtrate is absolutely clear. Thereupon in order to determine the precise quantity of lime that is required for the proper defecation, or hot defecation, the above filtrate is next submitted to a hot defecation by mixing the same with lime water containing a larger quantity of lime than is required for the precipitation of the non-saccharine substances that can be precipitated in a hot condition and it is under all circumstances sufficient, if the quantity of lime contained in the lime water will be 3.5% of the weight of the filtrate to be treated; the mixture is then heated and filtered and the excess of lime therein contained is determined by titration. When the quantity of lime has thus been determined both for the cold defecation and for the defecation proper, or hot defecation, by means of a small quantity of the juice that is to be purified, the cold defecation and thereupon the following hot defecation of the entire mass of the raw juice that is to be purified, is performed by employing the relative quantities of lime that have been previously determined, as above indicated. In the event that the sample does not easily filter, or if the filtrate should not be clear, such condition will indicate that the quantity of lime added to the raw juice has been too small and more lime should be added. If the filtrate should have a distinct yellow color this would signify that too much lime has been added. In this manner the mere filtration of a sample will enable quick determination of the quantity of lime required in proportion and in a most precise manner, or, in other words, the quantity of lime that it is necessary to add to the raw juice for the cold preliminary defecation may be determined with certainty. During the hot defecation or hot treatment the juice is heated as usual from 80 to 85 degrees centigrade. It must be distinctly pointed out that if it should be desired the determination of the quantity of lime required for the preliminary defecation can also be effected by titration in an analogous manner as has been indicated for the hot defecation proper.

The quantity of the non-sacchariferous substances that enter into combination with the lime and are therefore eliminated by the latter from the solution is determined by ascertaining by means of acids the quantity of lime that has not entered into reaction. The juice is then mixed with this quantity of lime to which is added the quantity that is necessary to increase the alkalinity of the juice to about 0.20. This excess of alkalinity is eliminated only subsequently during saturation.

The limit of alkalinity during the saturation is determined in the following manner: To a test quantity taken from the juice of the first saturation are added 2 or 3 drops of basic acetate of lead. If the liquid becomes turbid or a precipitate is obtained therein the juice is to be submitted to further saturation until repeated tests with acetate of lead will produce no turbidity. In the case of supersaturated juices the said turbidity will also take place.

If in the production of raw juices it should be intended to work with the so-called hot diffusion process or press-diffusion in consequence of which processes the said juices are obtained in a hot condition and the cold preliminary defecation is therefore eliminated the quantity of lime which is necessary for the preliminary defecation according to the process above described and which should be determined in a precise manner by means of the described processes of titration can be introduced into the diffusion in any desired form.

It has been ascertained by means of the new process that certain juices required 0.8% CaO, others 1.4%, others again 1.7% or even 3.6% CaO. These examples are sufficient to show clearly that for these juices the generally accepted rule that recommends for instance 1.5% CaO is quite as impracticable as that according to which 3% CaO should be added. The advantages already pointed out are also of great importance for the saturation, which operation has until now also been carried out according to fixed rules and the application of these permanent rules is as a matter of course bound to lead now and then to errors.

The possibility of a precise saturation distinctly correct for the particular juice treated will obviously have for result an exact purification of the juice and this can only be ascertained by the precise determination of the quantity of lime that is to be precipitated.

The advantages of the new process as compared with the working processes employed until now are expressed by the following statement of the results of experiments made. When comparing the total quantities of eliminated albumen the following figures are obtained: In the case of sugar juices treated according to the usual process 76.46% of albumen are eliminated, whereas according to the new process 80.04% of albumen are eliminated. In comparing the thick juices obtained by treatment according to the new process with those obtained according to the usual processes, it has been found that these juices when treated in accordance with the present application contain 15.02% less albumen and 35.52% less pectinous substances. Finally the coloration of the thick juice obtained according to the new process is 35.5% less than that of the thick juice obtained according to the usual process, while 50% less of lime are employed.

The advantages obtained by the employment of the new process are, as follows: (1) a more complete and thorough purifying of the juices; (2) in most cases a reduction of the required quantity of lime; (3) a reduction of the lime deposits in the purified juice; (4) a reduction of the deposits or of the lime crust in the evaporating apparatus and (5) the sure production of a good boiling operation in the vacuum pans.

Claim.

1. The method of determining the precise quantity of lime required for the defecation of beet root juices consisting in taking a small quantity of the diffusion juice as it comes from the diffusion battery and treating the same in a cold state with a quantity of lime, CaO or $Ca(OH)_2$, until a rich flaky precipitate is obtained, mixing a small portion of the juice that has been subjected to the said preliminary or cold treatment with a quantity of lime water containing a greater percentage of lime than is required for the precipitation of the non-saccharine substances by hot defecation, and finally treating a sample of the juice mixed with lime water by heat and filtering the same and determining the excess of lime necessary for the defecation proper by titration.

2. The method of determining the precise quantity of lime required for the defecation of beet root juices consisting in taking a small quantity of the diffusion juice as it comes from the diffusion battery and treating the same in a cold state with a quantity of lime, CaO or $Ca(OH)_2$, until a rich flaky precipitate is obtained, mixing a small portion of the juice that has been subjected to the said preliminary or cold treatment with a quantity of lime water containing a greater percentage of lime than is required for the precipitation of the non-saccharine substances by hot defecation, and finally determining the amount of lime in excess of that necessary for the defecation proper.

In testimony whereof I have hereunto set my hand in presence of two subscribing witnesses.

MIECZYSLAW KOWALSKI.

Witnesses:
 ROMAN ZIFFER,
 CYRYL SREDNICKI.